No. 853,947. PATENTED MAY 21, 1907.
T. H. BASTIN.
SPEED GEAR FOR MOTOR VEHICLES.
APPLICATION FILED OCT. 8, 1906.

5 SHEETS—SHEET 2.

Witnesses:
Inventor
Thomas H. Bastin
By his Attorney

No. 853,947. PATENTED MAY 21, 1907.
T. H. BASTIN.
SPEED GEAR FOR MOTOR VEHICLES.
APPLICATION FILED OCT. 8, 1906.

5 SHEETS—SHEET 3.

No. 853,947. PATENTED MAY 21, 1907.
T. H. BASTIN.
SPEED GEAR FOR MOTOR VEHICLES.
APPLICATION FILED OCT. 8, 1906.

5 SHEETS—SHEET 4.

Witnesses:

Inventor
Thomas H. Bastin
By Wm. E. Boulter,
Attorney

No. 853,947. PATENTED MAY 21, 1907.
T. H. BASTIN.
SPEED GEAR FOR MOTOR VEHICLES.
APPLICATION FILED OCT. 8, 1906.

5 SHEETS—SHEET 5.

UNITED STATES PATENT OFFICE.

THOMAS HUGH BASTIN, OF EAST MOLESEY, ENGLAND.

SPEED-GEAR FOR MOTOR-VEHICLES.

No. 853,947.     Specification of Letters Patent.     Patented May 21, 1907.

Application filed October 8, 1906. Serial No. 338,024.

*To all whom it may concern:*

Be it known that I, THOMAS HUGH BASTIN, a subject of the King of Great Britain, residing at East Molesey, Surrey, England, have invented certain new and useful Improvements in Speed-Gear for Motor-Vehicles, of which the following is a specification.

This invention relates to speed gear for motor vehicles and has for its main object to provide a simple form of reversing mechanism whereby a reverse drive may be obtained without interference with the speed ratio of the gear.

The invention also has for its object to provide a speed gear which is so mounted in its casing that all the parts are accessible and can be readily renewed.

Figure 1:
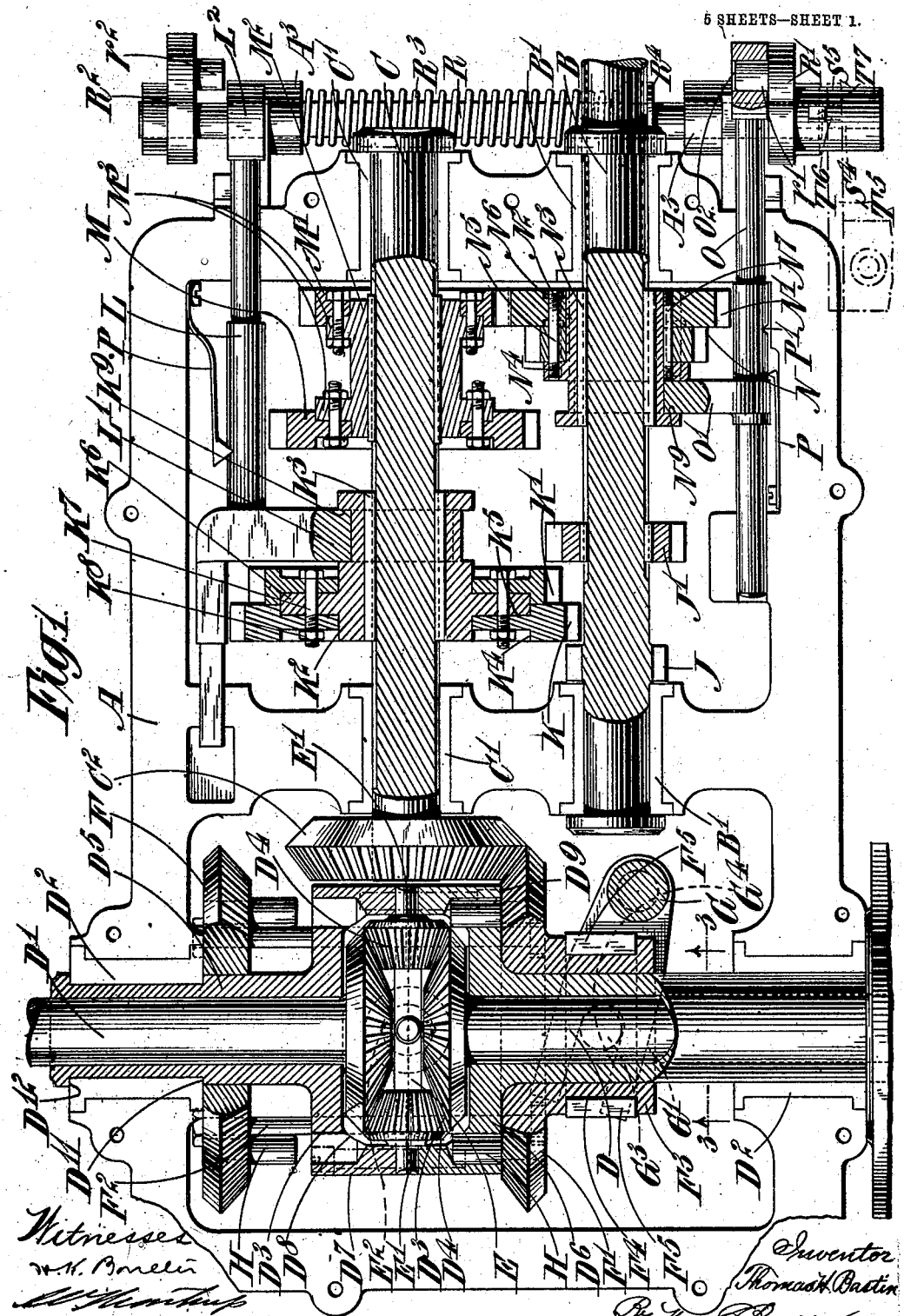
Figure 2:
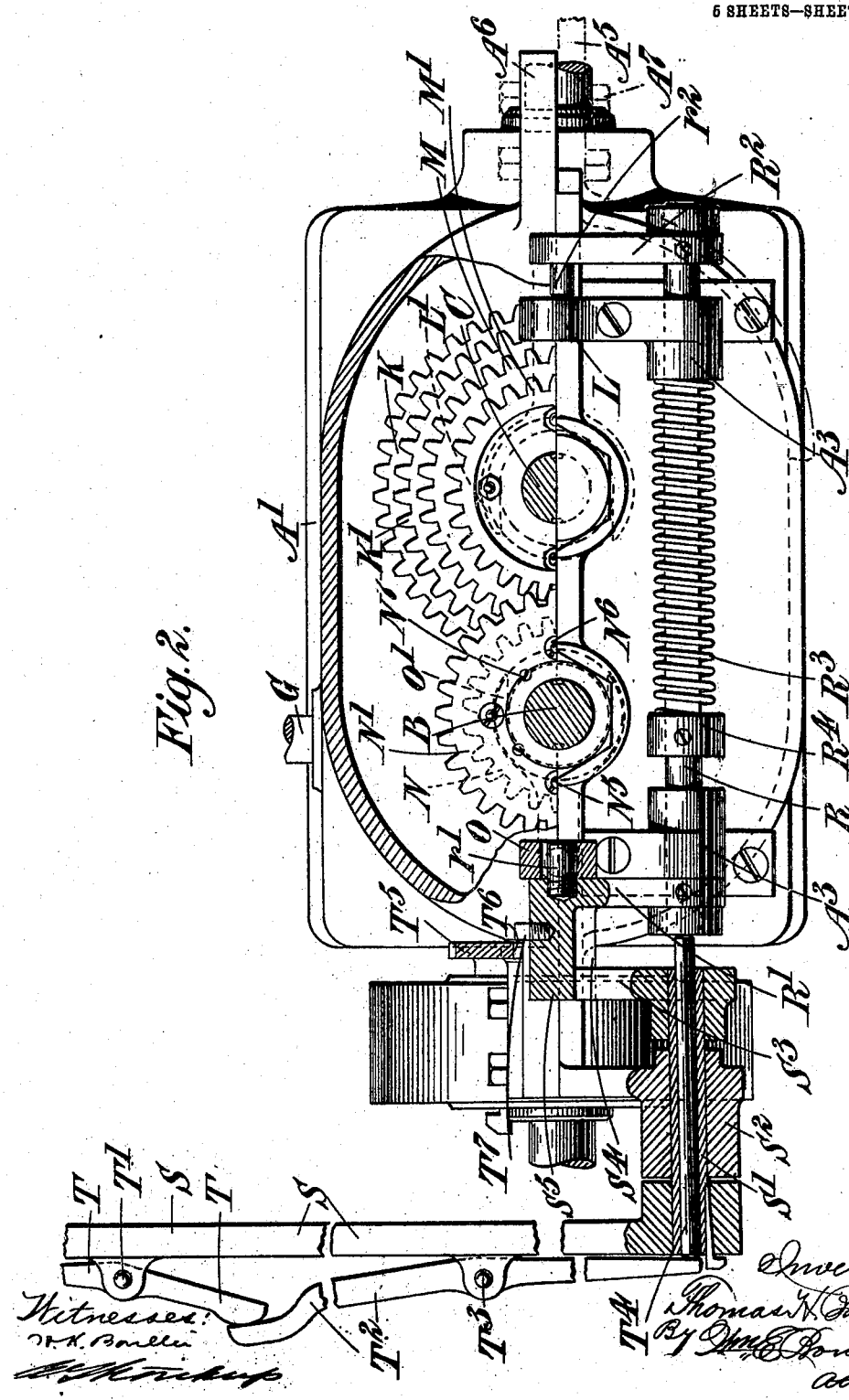
Figure 3:
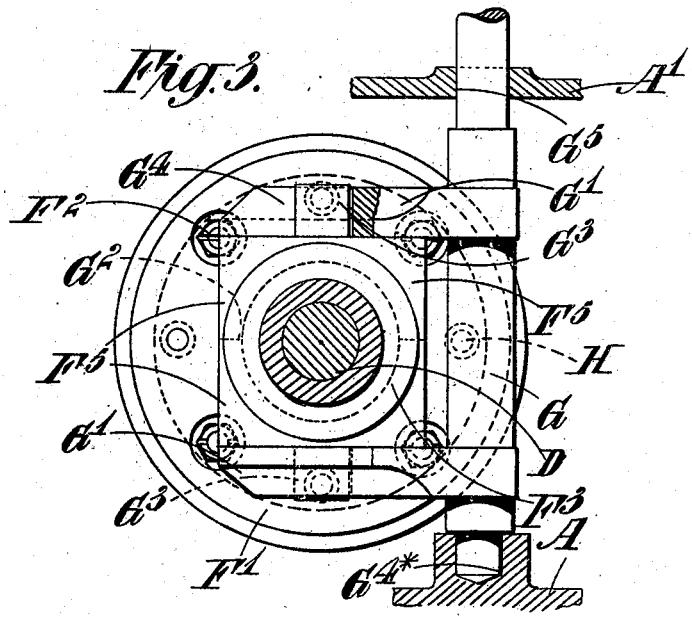
Figure 4:
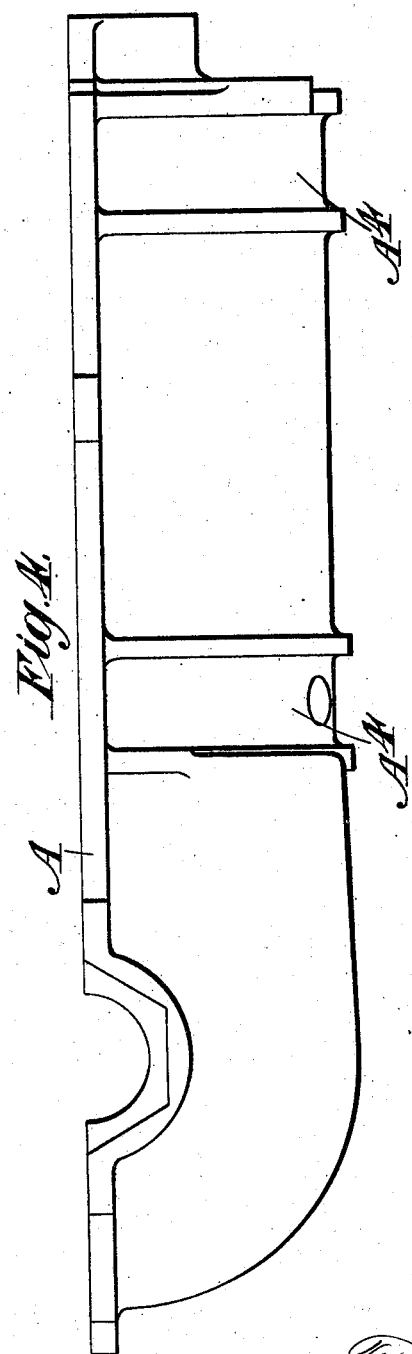
Figure 5:
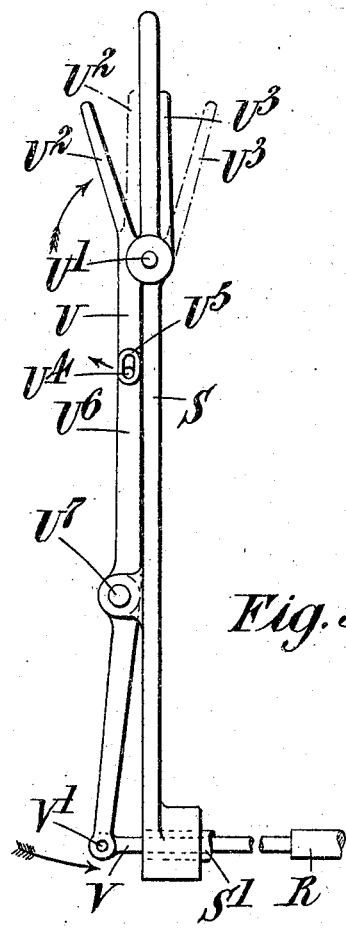

In the accompanying drawings which illustrate one method of carrying out this invention, Figure 1 is a central horizontal section through the gear, Fig. 2 is an end elevation viewed from the right of Fig. 1, parts being in section, Fig. 3 is an elevation of a detail shown in Fig. 1, Fig. 4 is a side elevation of the lower half of the gear box, and Fig. 5 is an elevation of a modified form of operating lever.

Like letters indicate like parts throughout the drawings.

The various parts of the speed gear and reversing mechanism are all carried in the lower half A of the casing or gear box and the various shafts and operating rods lie in the plane of division between the upper and lower portions of the gear box which are separable, so that by removing the upper portion $A^1$ the various members may be lifted out.

The speed reducing gear is arranged between two parallel shafts B and C. The shaft B is connected with the driving means and is carried in split bearings $B^1$ one half of which lies in the lower portion of the gear case and the other half in the upper portion of the same case. The shaft C is similarly mounted in split bearings $C^{1e}$ and carries at one end a toothed bevel wheel $C^2$.

A divided shaft D $D^1$ is carried in split bearings $D^2$ in the gear case and is situated at right angles to the shafts B and C. The two parts of the divided shaft are connected by a differential gear comprising as usual bevel wheels $D^3$, one on each portion of the shaft, and intermediate bevel pinions $D^4$. On each half shaft is mounted a sleeve, one indicated at $D^5$ and the other at $D^6$. Each of these sleeves has an enlarged end $D^7$ recessed at $D^8$ to receive the wheels $D^3$. The recesses are sufficiently deep to permit the enlarged ends of the sleeves to abut and the two sleeves are secured together by bolts and nuts $D^9$.

The intermediate pinions $D^4$ are preferably four in number and carried on the ends of a four-armed member E. The ends of this member are journaled to receive the pinions and extend beyond the same into orifices $E^1$ in the enlarged ends of the sleeve $D^5$ $D^6$. The axes of the orifices are arranged to coincide with the plane of division between the two sleeves so that when these are drawn apart, the four-armed member E is free and can be removed. In the center of the member E a transverse pin $E^2$ is mounted, the ends of which engage recesses in the opposed ends of the shaft portions D $D^1$. The object of this pin is to maintain the alinement of the shafts. The pin is itself rigidly held in place by the four-armed member E as this is prevented from movement in either direction by its engagement with the sleeves $D^5$ $D^6$.

It will be seen that the divided shaft does not itself rest in the bearings $D^2$ as it is inclosed at these points by the sleeves but the sleeves are necessarily a running fit on the shaft so that when the whole is lifted out of the bearings and the screws $D^9$ withdrawn, the two half portions of the shaft can be separated and the sleeves withdrawn therefrom without difficulty. The sleeve $D^5$ has shoulders $D^{11}$ $D^{12}$ which engage opposite ends of one of the bearings $D^2$ and thus prevent endwise movement of the shaft.

On the sleeve $D^5$ a bevel wheel F is carried and a similar but opposite bevel wheel $F^1$ is carried on the other sleeve $D^6$. The dimensions of the bevel wheels and the disposition of the shaft D $D^1$ is such that the wheels lie on opposite sides of the bevel wheel $C^2$ on the shaft C and are adapted to mesh with the same. The wheels F $F^1$ are connected together by spacing rods $F^2$ which pass through the enlarged ends $D^7$ of the sleeves and are a sliding fit therein. These rods constitute the only means of permanent connection between the bevel wheels and the sleeves so that the former are free to slide upon the sleeves although compelled to rotate with them.

The wheel $F^1$ has an extension or sleeve $F^3$ in which is formed a channel $F^4$ adapted to receive an operating member whereby the wheels may be moved backward and forward in the direction of the axis of the shaft D D¹. In the channel F⁴ a divided collar F⁵ is carried, (Figs. 1 and 3) the two portions of which are kept together by the arms G¹ of an operating member or fork G. The exterior of the collar is preferably made square so that two of the flat faces engage the arms G¹ and these two faces lie parallel to the plane of division G² of the collar. The square faces prevent rotation of the collar between the arms and thus insure against its getting into such a position as to allow the two parts to drop out of place. Each half collar portion carries a trunnion G³ and the arms are slotted as indicated at G⁴ to receive the same. The slots are extended to the ends of the arm so that the fork can be slid into position after the collar is put in place and the trunnions lie approximately in a line at right angles to the line of division of the collar, so that these would themselves prevent rotation of the collar even if the square faces referred to were omitted. The fork G is pivotally mounted in bearings G⁴* G⁵ in the bottom and top of the gear case respectively and may be connected with any suitable operating mechanism whereby it can be turned for the purpose of bringing either the wheel F or F¹ into engagement with the wheel C².

The wheels are spaced apart at such a distance that a free position is provided in which neither of the wheels engage the wheel C².

Each of the wheels F F¹ carries a series of pins H which project from that face toward the enlarged ends of the sleeves D⁵ D⁶ and the sleeves are provided with a series of orifices which register with the pins and open into the interior chamber formed by the recesses D⁸. The pins are of such length that when one wheel is in mesh with the wheel C² and its pins enter the orifices H to strengthen the means of engagement of the wheel with the sleeve the pins on the other wheel are entirely withdrawn from their orifices. The gear case A is made to constitute an oil bath and sufficient lubricant is maintained in the chamber in which this part of the mechanism is contained to insure that the enlarged ends of the sleeves dip into the same whereupon the lubricant will find its way into those orifices H which are not engaged by their pins, with the result that when the wheels F F¹ are moved axially so that the pins formerly not in engagement enter the orifices the lubricant contained therein will be forced into the chamber formed by the recesses D⁸.

The gear as shown in the drawings is arranged to give four different speeds and the reverse operates with all of the speeds as it will be seen that when the wheel F is brought into mesh with the wheel C² driving will be effected in the opposite direction to that obtained by the wheel F¹ shown to be in mesh in the drawings, regardless of what gears may be in operation between the shafts B and C. The lowest speed is obtained by a pinion J preferably cut solid on the driving shaft. This is adapted to engage a wheel K which together with a second wheel K¹ is carried on a sleeve K² free to slide on the shaft C with which it is engaged by a key K³ so that although able to slide it is compelled to rotate with the shaft. Each of the wheels K K¹ is in the form of a toothed annulus recessed on both sides as at K⁴ K⁵ and the sleeve K² has a flange K⁶ which is made to fit the recesses in the wheels. The center of each annulus is fitted to the sleeve K² and both wheel members are secured to the sleeve by bolts and nuts K⁷ K⁸ which pass through the flange K⁶ of the sleeve.

The sleeve is grooved at K⁹ to receive the operating fork L¹ of an operating member L which latter slides in bearings formed in the gear casing. The bearings are so disposed that their axes coincide with the line of division of the casing as with those of the shafts B and C so that when the top half of the casing is removed the operating member can be lifted out.

The pinion J lies to the left of the wheels K K¹ and a second pinion J¹ is secured to the shaft B and lies to the right of these wheels. This second pinion is adapted to mesh with the wheel K¹ so that by moving the sleeve K² to the left the low speed is obtained and by moving it to the right the second speed is obtained while in the central position shown, the wheels do not engage either pinion. The object of forming each of the wheels K K¹ as an annular and securing it by bolts and nuts is to enable each to be removed and reversed so that when the corners of the teeth on one side are worn by being brought into and out of engagement, the other side of the wheel may be used as the engaging side. By recessing the wheels and making them recesses to fit the flange K⁶ as well as the center of each annulus being made to fit the sleeve, the various parts are rigidly held together and rendered more secure than would be the case if each annular member were merely bolted to the flange without this special fitting, or secured to the sleeve without a flange. In addition to the annular members being reversible they are of course readily renewed by releasing the bolts and replacing them with new members.

The third and fourth speeds are obtained by annular wheels, M M¹ respectively, secured to a sleeve M² having flanges M³. In this case each annular wheel is secured to a separate flange but otherwise the construction is the same as that described with reference to the wheels K K¹. The sleeve M² however is rigidly secured to the shaft C. Co-operating with the wheels M M¹ are two annular wheels N N¹. These wheels are not recessed but are fitted on a sleeve N² free to slide upon the shaft but connected thereto by a key $N^3$ so that it rotates therewith. The sleeve has a shoulder or flange $N^4$ and the wheels $N$ $N^1$ are secured thereto by bolts $N^5$ and nuts $N^6$. To further secure the wheels, keys $N^7$ are introduced between the exterior face of the sleeve and the interior faces of the wheels. These keys are preferably parallel and are screwed or otherwise secured in the flange $N^4$. By releasing the nuts $N^6$ the annular wheels $N$ $N^1$ can be withdrawn from the sleeve and reversed or renewed. The sleeve $N^2$ has a channel $N^9$ to receive the fork $O^1$ of an operating member $O$. The operating member $O$ lies in the same plane as the shafts B C and the other operating member L, and slides in bearings arranged in the same manner as those of the latter member but is disposed on the opposite side of the gear case. By moving the operating member to the left the pinion N is brought into mesh with the wheel M giving the third speed, and by moving it to the right in which position it is shown in the figure, the wheel $N^1$ is brought into mesh with the wheel $M^1$ giving the fourth speed.

Each operating member is provided with a spring-controlled detent P which engages a notch $P^1$ in the member and prevents the member from accidental movement when lying in the neutral position.

The operating members extend beyond the gear case and are provided with eyes $O^2$ $L^2$ respectively. In suitable bearings $A^3$ on the gear case a rocking shaft R is mounted and the shaft carries two arms $R^1$ $R^2$ so situated that the operating members O and L lie between them. Each arm carries a pin $r^1$ $r^2$ respectively and these pins are adapted to register with the eyes in the rods. The rocking shaft R is free to slide in its bearings a sufficient distance to bring one or other of the pins into engagement with the corresponding operating rod and a spring $R^3$ which rests at one end against one of the bearings $A^3$ and at the other end against a collar $R^4$ on the shaft, always tends to maintain the shaft in such position that the low speed member L is in engagement with the pin $r^2$ on the arm $R^2$ thereof.

For operating the rocking shaft a hand lever S is provided and this is keyed fast to a sleeve $S^1$ carried rotatably in a bracket $S^2$ secured to the casing of the gear. At that end of the sleeve $S^1$ remote from the operating lever, an arm $S^3$ is secured and the end of this arm enters a slot $S^4$ which is formed in a horizontal extension $S^5$ of the arm $R^1$ on the rocking shaft. Pivoted at $T^1$ to the lever S is a releasing lever T whose end engages a second lever $T^2$ pivoted at $T^3$ to the lever S. The free end of this lever $T^2$ bears against a plunger or push-rod $T^4$ carried within the sleeve $S^1$ and the opposite end of the push-rod is in contact with the end of the rocking shaft R.

It will be seen that by swinging the operating lever S to the left or right of Fig. 1, the operating rod L will be moved to throw in one or other of the low speeds as the rocking shaft is moved by the arm $S^3$ and the rod L is engaged by the arm $R^2$ and its pin $r^2$. If now the rocking shaft is moved into the central position so that the rod L is brought into the neutral position and then the auxiliary lever T be operated, the rod $T^4$ will be advanced and thus push forward the rocking shaft against the action of its spring $R^3$ until the pin $r^1$ of the arm $R^1$ is brought into engagement with the eye in the operating rod O; this movement will simultaneously bring the pin $r^2$ of the arm $R^2$ out from its engagement with the rod L. Movement of the operating lever S will now move the rod O instead of the rod L, for bringing in one or other of the high speeds. The arm $S^3$ engaging the slotted extension $S^5$ of the arm $R^1$ allows the endwise movement of the rocking shaft R without its becoming disengaged therefrom.

To insure that the rocking shaft is brought to the central position before moving it endwise and also to prevent its accidental movement in an endwise direction, after it has been operated to throw in one or other of the gears, a guide-plate $T^5$ is secured to the gear case and has a slot $T^6$ adapted to receive a pin or stud $T^7$ on the arm $R^1$ of the rocking shaft. When the rocking shaft is at the limit of its movement in either direction, the pin $T^7$ is free of the guide $T^5$ but to bring the rocking shaft from one endwise position into the other, the pin must pass through the slot $T^6$, and as the slot and pin are so disposed that this can only take place when the rocking shaft is in the proper position for bringing both of the operating rods into the neutral position, it will be seen that this insures the proper alinement of the arm $R^1$ or $R^2$ with that rod which is about to be engaged before endwise movement of the rocking shaft is commenced; moreover, after the rocking shaft has been brought to the limit of its endwise movement in either direction and moved to bring in one or other of the gears it cannot be brought out of engagement with that operating rod which at the moment is engaged, without first bringing the same back to the neutral position.

As there is a possibility of the spring moving the rocking shaft endwise when passing the notch $T^6$ to go say, from the lowest to the second speed, the rocking shaft may be positively operated in both directions if desired. For this purpose the operating lever S (Fig. 5) has pivoted to it at $U^1$ a lever U provided with two operating handles $U^2$ $U^3$. The end of the lever carries a pin $U^4$ which engages an eye U⁵ in the end of a second lever U⁶ pivoted at U⁷ to the lever S. Instead of the push-rod T⁴ a rod V is mounted in the sleeve S¹ and secured at one end by a pin V¹ to the free end of the lever U⁶ and at the other end to the rocking shaft R. It will be seen that when the handle U³ of the lever U is pressed home against the operating lever S as shown in Fig. 5, the rod V is drawn to the left of that figure, so that the rocking shaft R is correspondingly moved but when the handle U² is moved so that it lies against the operating lever S, the rod V will be advanced, carrying with it the rocking shaft R so that this is brought into its second operative position by this means.

The lower half A of the casing is provided with transverse grooves A⁴ adapted to receive the frame members by which the gear box is secured to the main frame of the vehicle. These frame members, one of which is indicated at A⁵ (Fig. 2), are bent to correspond to the underside of the gear box and extend upwardly on either side of the gear box where they are bent to lie flush with the opposing faces of the two half portions. The upper portion A¹ of the box has lugs A⁶ (one of which is shown in Fig. 2) and these extend over, and are secured to, the frame members by bolts A⁷. It will thus be seen that the gear box is rigidly secured to the frame members and constitutes a strut or brace by which they are connected; the whole is by this means rendered rigid.

What I claim as my invention and desire to secure by Letters Patent is:—

1. In a change speed gear the combination of, two parallel shafts, a frame to carry the same, speed reducing gears for connecting them, a bevel wheel fast on the end of one shaft, a divided shaft disposed at an angle to the other two shafts, differential gears connecting the two parts of this shaft, oppositely disposed bevel wheels carried by the outside member of the differential gears in such manner that they are compelled to rotate therewith but are free to move axially thereon, means for supporting the divided shaft in such position that the bevel wheels lie on opposite sides of the first mentioned bevel wheel with which they are adapted to mesh, means for moving the sliding bevel wheels axially to bring one or other of them into and the other out of mesh, and means for spacing the sliding bevel wheels apart so that at one point in their axial movement neither wheel is in mesh with the intermediate wheel, substantially as set forth.

2. In a change speed gear the combination of two parallel shafts, a frame to carry the same, speed reducing gears for connecting them, a driving bevel wheel fast on the end of one shaft, a divided shaft disposed at an angle to the two other shafts, bevel wheels one on each of the opposed ends of the portions of the divided shaft the beveled faces of the wheels being disposed toward each other, auxiliary bevel pinions situated between them, and gearing them together a sleeve mounted free on each portion of the shaft each sleeve having an enlarged end recessed to receive the bevel wheel mounted thereon the recesses being of such depth that the ends of the sleeves butt against each other and form between them a chamber, a transverse spindle carried in recesses in the abutting ends of the sleeves and having mounted free thereon the aforesaid auxiliary pinions, means for securing these sleeves against endwise movement, oppositely disposed driven bevel wheels carried on the sleeves in such manner that they are compelled to rotate therewith but are free to move axially thereon, means for supporting the divided shaft in such position that these bevel wheels lie on opposite sides of the first mentioned driving bevel wheel with which they are adapted to mesh, means for moving the driven bevel wheels axially to bring one or other into and the other out of mesh, and spacing rods connecting the two driven bevel wheels together and passing through the enlarged ends of the sleeves substantially as set forth.

3. In a change speed gear the combination of, two parallel shafts, a frame to carry the same, speed reducing gears for connecting them, a driving bevel wheel fast on the end of one shaft, a divided shaft disposed at an angle to the other two shafts, bevel wheels one on each of the opposed ends of the portions of the divided shaft the beveled faces of the wheels being disposed toward each other, auxiliary bevel pinions situated between them, and gearing them together a sleeve mounted free on each portion of the shaft each sleeve having an enlarged end recessed to receive the bevel wheel mounted thereon the recesses being of such depth that the ends of the sleeves butt against each other and form between them a chamber, a transverse spindle carried in recesses in the abutting ends of the sleeves and having mounted free thereon the aforesaid auxiliary pinions, means for securing these sleeves against endwise movement, oppositely disposed driven bevel wheels carried on the sleeves in such manner that they are compelled to rotate therewith but are free to move axially thereon, means for supporting the divided shaft in such position that these bevel wheels lie on opposite sides of the first mentioned driving bevel wheel with which they are adapted to mesh, means for moving the driven bevel wheels axially to bring one or other into and the other out of mesh, a spacing rod connecting the two driven bevel wheels together and passing through the enlarged ends of the sleeves, the sleeves also having orifices therein whose axes lie parallel with the axis of the divided shaft such orifices opening into the chamber formed by the recesses in the enlarged ends of the sleeves, pins on the driven bevel wheels adapted to enter the orifices of the sleeves as one wheel or other is brought into mesh but which are withdrawn from the orifices when the wheel on which they are carried is not in mesh and a lubricating bath so situated that the enlarged ends of the sleeves dip into the lubricant contained therein, substantially as set forth.

4. In a change speed gear the combination of, two parallel shafts, a frame to carry the same, speed reducing gears for connecting them, a driving bevel wheel fast on the end of one shaft, a divided shaft disposed at an angle to the other two shafts, bevel wheels one on each of the opposed ends of the portions of the divided shaft the beveled faces of the wheels being disposed toward each other, auxiliary bevel pinions situated between them and gearing them together, a sleeve mounted free on each portion of the shaft each sleeve having an enlarged end recessed to receive the bevel wheel mounted thereon the recesses being of such depth that the ends of the sleeves butt against each other and form between them a chamber, a transverse spindle carried in recesses in the abutting ends of the sleeves and having mounted free thereon the aforesaid auxiliary pinions of the differential gear, transverse arms on the spindle extending from opposite sides thereof and lying in the same plane as the spindle the ends of the arms entering recesses in the abutting ends of the sleeves as with the spindle whereby endwise movement of the spindle is prevented, pins projecting from the spindle in the axial line of the divided shafts these pins being disposed on opposite sides of the spindle and each entering a recess in the end of that shaft portion toward it, means for securing the sleeves on the divided shaft against endwise movement, oppositely disposed driven bevel wheels carried on the sleeves in such manner that they are compelled to rotate therewith but are free to move axially thereon, means for supporting the divided shaft in such position that these bevel wheels lie on opposite sides of the first mentioned driving bevel wheel with which they are adapted to mesh, means for moving the driven bevel wheels axially to bring one or other into and the other out of mesh, and spacing rods connecting the two driven bevel wheels together and passing through the enlarged ends of the sleeves substantially as set forth.

5. In a change speed gear the combination of, two parallel shafts, a plurality of wheels fast on one shaft, a plurality of wheels compelled to rotate with but free to slide on the other shaft, an operating member disposed parallel to the shafts and in the same plane, means for engaging this operating member with the sliding wheels on one of the shafts, a divided casing wherein the shafts and operating members are mounted the division being arranged in the same plane as that occupied by the shafts so that when one half of the casing is removed the shafts and operating members can be lifted out, a bevel wheel fast on the end of one of these shafts, a third shaft disposed at an angle to the other two shafts, oppositely disposed bevel wheels carried thereon in such manner that they are compelled to rotate therewith but are free to move axially thereon, means for supporting this shaft in such position that the bevel wheels lie on opposite sides of the first mentioned bevel wheel with which they are adapted to mesh, means for moving the sliding bevel wheels axially to bring one or other of them into and the other out of mesh, and means for spacing the sliding bevel wheels apart so that at one point in their axial movement neither wheel is in mesh with the intermediate wheel, substantially as set forth.

6. In a change speed gear the combination of, two parallel shafts, a toothed wheel fast on one shaft, a toothed wheel fast on the second shaft, a toothed wheel free to slide on the first shaft but compelled to rotate therewith and adapted to engage the fast wheel on the second shaft, a toothed wheel free to slide on the second shaft but compelled to rotate therewith and adapted to engage the fixed wheel on the first shaft, an operating member disposed parallel to the shafts and in the same plane, means for engaging this operating member with the sliding wheel on one of the shafts, a second operating member disposed parallel to the shafts and in the same plane, means for engaging this operating member with the sliding wheel on the other shaft, a divided casing wherein the shafts and operating members are mounted the division being arranged in the same plane as that occupied by the shafts so that when one half of the casing is removed the shafts and operating members can be lifted out, a bevel wheel fast on the end of one of these shafts, a third shaft disposed at an angle to the other two shafts, oppositely disposed bevel wheels carried thereon in such manner that they are compelled to rotate therewith but are free to move axially thereon, means for supporting this shaft in such position that the bevel wheels lie on opposite sides of the first mentioned bevel wheel with which they are adapted to mesh, means for moving the sliding bevel wheels axially to bring one or other of them into and the other out of mesh, and means for spacing the sliding bevel wheels apart so that at one point in their axial movement neither wheel is in mesh with the intermediate wheel, substantially as set forth.

7. In a change speed gear the combination of, two parallel shafts, a frame to carry the same, a toothed wheel fast on one shaft, a toothed wheel fast on the second shaft, a toothed wheel free to slide on the first shaft but compelled to rotate therewith and adapted to engage the fast wheel on the second shaft, a toothed wheel free to slide on the second shaft but compelled to rotate therewith and adapted to engage the fixed wheel on the first shaft, an operating rod disposed parallel to the shafts and in the same plane, means for engaging this operating member with the sliding wheel on the first shaft, a second operating rod disposed parallel to the shafts and in the same plane, means for engaging this operating member with the sliding wheel on the second shaft, a rocking shaft disposed at right angles to the operating rods and adapted to slide endwise in its supports, arms on the rocking shaft disposed one on one side of one of the operating rods and the other on the opposite side of the other rod, means for sliding the rocking shaft endwise so that one or other of the arms is moved toward one of the operating rods, a pin on one of the relatively advanced members whereby engagement is effected the opposite part being recessed to receive the pin the arms being so spaced apart that when one arm is in engagement with one of the operating rods the other is clear of the second operating rod, a bevel wheel fast on the end of one of these shafts, a third shaft disposed at an angle to the other two shafts, oppositely disposed bevel wheels carried thereon in such manner that they are compelled to rotate therewith but are free to move axially thereon, means for supporting this shaft in such position that the bevel wheels lie on opposite sides of the first mentioned bevel wheel with which they are adapted to mesh, means for moving the sliding bevel wheels axially to bring one or other of them into and the other out of mesh, and means for spacing the sliding bevel wheels apart so that at one point in their axial movement neither wheel is in mesh with the intermediate wheel, substantially as set forth.

8. In a change speed gear the combination of, two parallel shafts, a frame to carry the same, a toothed wheel fast on one shaft, a toothed wheel fast on the second shaft, a toothed wheel free to slide on the first shaft but compelled to rotate therewith and adapted to engage the fast wheel on the second shaft, a toothed wheel free to slide on the second shaft but compelled to rotate therewith and adapted to engage the fixed wheel on the first shaft, an operating rod disposed parallel to the shafts and in the same plane, means for engaging this operating member with the sliding wheel on the first shaft, a second operating rod disposed parallel to the shafts and in the same plane, means for engaging this operating member with the sliding wheel on the second shaft, a rocking shaft disposed at right angles to the operating rods and adapted to slide in its supports, arms on the rocking shaft disposed one on one side of one of the operating rods and the other on the opposite side of the other rod the arms being adapted to engage with the rods, means for sliding the shaft endwise so that one or other of the arms is moved into engagement with one of the operating rods the second arm being at such time brought out of engagement with the second rod, a guide having a recess opposed to the endwise movement of the rocking shaft, a projection on the rocking shaft adapted to enter the recess of the guide as the shaft is moved endwise whereby the shaft is always brought to the same angular position before it can move endwise the guide being of such length that when the shaft arrives at the limit of its endwise movement in either direction the engaging part thereof is free of the guide, a bevel wheel fast on the end of one of these shafts, a third shaft disposed at an angle to the other two shafts, oppositely disposed bevel wheels carried thereon in such manner that they are compelled to rotate therewith but are free to move axially thereon, means for supporting this shaft in such position that the bevel wheels lie on opposite sides of the first mentioned bevel wheel with which they are adapted to mesh, means for moving the sliding bevel wheels axially to bring one or other of them into and the other out of mesh, and means for spacing the sliding bevel wheels apart so that at one point in their axial movement neither wheel is in mesh with the intermediate wheel, substantially as set forth.

9. In a change speed gear the combination of, two parallel shafts, a frame to carry the same, a toothed wheel fast on one shaft, a toothed wheel fast on the second shaft, a toothed wheel free to slide on the first shaft but compelled to rotate therewith and adapted to engage the fast wheel on the second shaft, a toothed wheel free to slide on the second shaft but compelled to rotate therewith and adapted to engage the fixed wheel on the first shaft, an operating rod disposed parallel to the shafts and in the same plane, means for engaging this operating member with the sliding wheel on the first shaft, a second operating rod disposed parallel to the shafts and in the same plane, means for engaging this operating member with the sliding wheel on the second shaft, a rocking shaft disposed at right angles to the operating rods and adapted to slide in its supports, arms on the rocking shaft disposed one on one side of one of the operating rods and the other on the opposite side of the other rod the arms being adapted to engage with the rods, means for sliding the shaft endwise so that one or other of the arms is moved into engagement with one of the operating rods the second arm being at such time brought out of engagement with the second rod, a guide having a recess opposed to the endwise movement of the rocking shaft a projection on the rocking shaft adapted to enter the recess of the guide as the shaft is moved endwise whereby the shaft is always brought to the same angular position before it can move endwise the guide being of such length that when the shaft arrives at the limit of its endwise movement in either direction the engaging part thereof is free of the guide, an operating lever free to swing about a center co-axial with the axis of the rocking shaft, means whereby the lever is engaged with the rocking shaft in such manner that the latter is free to move endwise without becoming disengaged from the lever, a second lever pivoted to the first in such manner that it swings about an axis at right angles to the axis of the rocking shaft this lever extending from both directions at the point to which it is pivoted, means for connecting one end of this lever to the rocking shaft in such manner that the rocking shaft moves endwise with the lever but is free to rock relatively thereto, a bevel wheel fast on the end of one of these shafts, a third shaft disposed at an angle to the other two shafts, oppositely disposed bevel wheels carried thereon in such manner that they are compelled to rotate therewith but are free to move axially thereon, means for supporting this shaft in such position that the bevel wheels lie on opposite sides of the first mentioned bevel wheel with which they are adapted to mesh, means for moving the sliding bevel wheels axially to bring one or other of them into and the other out of mesh, and means for spacing the sliding bevel wheels apart so that at one point in their axial movement neither wheel is in mesh with the intermediate wheel, substantially as set forth.

10. In a change speed gear the combination of, two parallel shafts, a frame to carry the same, a flange carried by and rotating with one shaft, a reversible externally toothed annulus recessed on each side to receive and fit the flange the center of the annulus being fitted to that part over which it is slid to engage the flange, means for detachably securing the annulus to the flange, a wheel on the second shaft adapted to gear with this annular toothed wheel, a bevel wheel fast on the end of one shaft, a third shaft disposed at an angle to the other two shafts, oppositely disposed bevel wheels carried thereon in such manner that they are compelled to rotate therewith but are free to move axially thereon, means for supporting this shaft in such position that the bevel wheels lie on opposite sides of the first mentioned bevel wheel with which they are adapted to mesh, means for moving the sliding bevel wheels axially to bring one or other of them into and the other out of mesh, and means for spacing the sliding bevel wheels apart so that at one point in their axial movement neither wheel is in mesh with the intermediate wheel, substantially as set forth.

11. In a change speed gear the combination of, two parallel shafts, a frame to carry the same, a sleeve on one of these shafts, a flange on the sleeve, a reversible externally toothed annulus recessed at both sides to receive and fit the flange, the center portion of the annulus being made a fit for the sleeve, means for detachably securing the annulus to the flange, a wheel on the second shaft adapted to gear with this annular toothed wheel, a bevel wheel fast on the end of one shaft, a third shaft disposed at an angle to the other two shafts, oppositely disposed bevel wheels carried thereon in such manner that they are compelled to rotate therewith but are free to move axially thereon, means for supporting this shaft in such position that the bevel wheels lie on opposite sides of the first mentioned bevel wheel with which they are adapted to mesh, means for moving the sliding bevel wheel axially to bring one or other of them into and the other out of mesh, and means for spacing the sliding bevel wheels apart so that at one point in their axial movement neither wheel is in mesh with the intermediate wheel, substantially as set forth.

12. In a change speed gear the combination of, two parallel shafts, a frame to carry the same, a flange carried by and rotating with one shaft, a reversible externally toothed annulus recessed on each side to receive and fit the flange, the center of the annulus being fitted to that part over which it is slid to engage the flange, means for detachably securing the annulus to the flange, a sleeve on the second shaft, a flange thereon, an externally toothed annulus adapted to mesh with the annulus on the other shaft, fitted with a boss on the sleeve so that it butts against the flange, keys between the sleeve and annulus, bolts connecting the annulus with the flange, a bevel wheel fast on the end of one shaft, a third shaft disposed at an angle to the other two shafts, oppositely disposed bevel wheels carried thereon in such manner that they are compelled to rotate therewith but are free to move axially thereon, means for supporting this shaft in such position that the bevel wheels lie on opposite sides of the first mentioned bevel wheel with which they are adapted to mesh, means for moving the sliding bevel wheels axially to bring one or other of them into and the other out of mesh, and means for spacing the sliding bevel wheels apart so that at one point in their axial movement neither wheel is in mesh with the intermediate wheel, substantially as set forth.

13. In a change speed gear the combination of, two parallel shafts, a frame to carry the same, a plurality of wheels fast on one shaft, a plurality of wheels compelled to rotate with but free to slide on the second shaft and adapted to mesh with the wheels on the first shaft, a bevel wheel fast on the end of one of these shafts, a third shaft disposed at an angle to the other two shafts, oppositely disposed bevel wheels carried thereon in such manner that they are compelled to rotate therewith but are free to move axially thereon, means for supporting this shaft in such position that the bevel wheels lie on opposite sides of the first mentioned bevel wheel with which they are adapted to mesh, means for spacing the sliding bevel wheels apart so that at one point in their axial movement neither wheel is in mesh with the intermediate wheel, an operating member for sliding one of the speed changing portions of the gear, a channeled sleeve on such sliding portion, a collar transversely divided and adapted to lie in the channel of the sleeve, a fork on the operating member the two arms of which are spaced apart sufficiently wide to embrace the collar, means for supporting the operating member in such position that the arms of the fork engage the half collar portions at points on a line approximately at right angles to the plane of division and thus hold the two portions together, and trunnions on one of the engaging members (namely the fork and collar) the other engaging member being correspondingly slotted so that movement of the fork moves the collar axially, substantially as set forth.

14. In a change speed gear the combination of two parallel shafts, a frame to carry the same, a plurality of wheels fast on one shaft, a plurality of wheels compelled to rotate with but free to slide on the second shaft and adapted to mesh with the wheels on the first shaft, a bevel wheel fast on the end of one of these shafts, a third shaft disposed at an angle to the other two shafts, oppositely disposed bevel wheels carried thereon in such manner that they are compelled to rotate therewith but are free to move axially thereon, means for supporting this shaft in such position that the bevel wheels lie on opposite sides of the first mentioned bevel wheel with which they are adapted to mesh, means for spacing the sliding bevel wheels apart so that at one point in their axial movement neither wheel is in mesh with the intermediate wheel, an operating member for sliding one of the speed changing portions of the gear, a channeled sleeve on such sliding portion, a collar transversely divided and adapted to lie in the channel of the sleeve, a fork on the operating member the two arms of which are spaced apart sufficiently wide to embrace the collar, a trunnion on each half portion of the collar the trunnions being disposed in a plane at right angles to the plane of division, and means for supporting the operating member in such position that the arms of the fork each of which is slotted can be slid into position so that the trunnions enter the slots and the arms prevent the falling apart of the two half collar portions, substantially as set forth.

In testimony whereof I have signed my name to this specification in the presence of two subscribing witnesses.

THOMAS HUGH BASTIN.

Witnesses:
HARRY S. BRIDGES,
A. M. HAYWARD.